United States Patent
Al-Duwaish

(10) Patent No.: US 8,620,631 B2
(45) Date of Patent: Dec. 31, 2013

(54) METHOD OF IDENTIFYING HAMMERSTEIN MODELS WITH KNOWN NONLINEARITY STRUCTURES USING PARTICLE SWARM OPTIMIZATION

(75) Inventor: Hussain N. Al-Duwaish, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 371 days.

(21) Appl. No.: 13/084,429

(22) Filed: Apr. 11, 2011

(65) Prior Publication Data

US 2012/0259600 A1    Oct. 11, 2012

(51) Int. Cl.
   G06F 7/60    (2006.01)
   G06F 17/10   (2006.01)
   G06F 17/11   (2006.01)

(52) U.S. Cl.
   USPC .......................................................... 703/2

(58) Field of Classification Search
   None
   See application file for complete search history.

(56) References Cited

U.S. PATENT DOCUMENTS

| | | | |
|---|---|---|---|
| 6,657,566 B1 | 12/2003 | Risbo et al. | |
| 7,225,107 B2 | 5/2007 | Buxton et al. | |
| 7,272,454 B2 | 9/2007 | Wojsznis et al. | |
| 7,356,518 B2 | 4/2008 | Bonabeau et al. | |
| 7,444,309 B2 | 10/2008 | Branke et al. | |
| 8,346,693 B2 * | 1/2013 | Al-Duwaish et al. | 706/21 |
| 8,346,711 B2 * | 1/2013 | Al-Duwaish et al. | 706/62 |
| 8,346,712 B2 * | 1/2013 | Rizvi et al. | 706/62 |
| 2006/0212279 A1 | 9/2006 | Goldberg et al. | |
| 2007/0043513 A1 | 2/2007 | Vandecasteele | |
| 2007/0156288 A1 | 7/2007 | Wroblewski et al. | |
| 2007/0250215 A1 | 10/2007 | Jia et al. | |
| 2007/0263936 A1 | 11/2007 | Owechko | |
| 2008/0270028 A1 | 10/2008 | Abubakar et al. | |
| 2008/0307399 A1 | 12/2008 | Zhou et al. | |
| 2009/0030891 A1 | 1/2009 | Skubacaz et al. | |

OTHER PUBLICATIONS

Hou, Z. "Hammerstein Model Identification Based on Adaptive Particle Swarm Optimization", 2007, IEEE, Workshop on Intelligent Information Technology Application, pp. 137-140.*

Torghabeh et al. "Neural Networks Hammerstein Model Identification Based on Partcile Swarm Optimization", 2007, pp. 363-267.*

* cited by examiner

*Primary Examiner* — Suzanne Lo
(74) *Attorney, Agent, or Firm* — Richard C. Litman

(57) ABSTRACT

The method of identifying Hammerstein models with known nonlinearity structures using particle swarm optimization provides a computerized method utilizing a particle swarm optimization (PSO)-based scheme for the identification of nonlinear Hammerstein models with known nonlinearity structures. Particularly, this is accomplished by formulating the identification of the Hammerstein model as an optimization problem, with PSO being used in the optimization process.

7 Claims, 3 Drawing Sheets

METHOD OF IDENTIFYING HAMMERSTEIN MODELS WITH KNOWN NONLINEARITY STRUCTURES USING PARTICLE SWARM OPTIMIZATION

BACKGROUND OF THE INVENTION

1. Field of the Invention

The present invention relates to numerical modeling techniques used in engineering, and particularly to a computerized method of identifying Hammerstein models with known nonlinearity structures using particle swarm optimization.

2. Description of the Related Art

The Hammerstein model belongs to a family of block-oriented models, and is made up of a memoryless nonlinear part followed by a linear dynamic part. FIG. 1 illustrates a diagrammatic overview of the basic Hammerstein model structure 10, with a static nonlinear part 12 and a linear dynamic part 14. The Hammerstein model has been known to effectively represent and approximate several industrial processes, such as pH neutralization processes, distillation column processes, and heat exchange processes. Hammerstein models have also been used to successfully model nonlinear filters, biological systems, water heaters, nonlinear networks, the detection of signals in non-Gaussian noise, nonlinear prediction, nonlinear data transmission channels, control systems, noise cancellation, heat exchangers, and electrical drives. These examples illustrate the need for algorithms that are effectively able to recover nonlinearities in systems of various kinds.

A significant amount of research has been carried out on identification of Hammerstein models. Systems can be modeled by employing either nonparametric or parametric models. Nonparametric representations involve kernel regression or expansion of series, such as the Volterra series. This results in a theoretically infinite number of model parameters, and is therefore represented in terms of curves, such as step responses or bode diagrams. Parametric representations, such as state-space models, are more compact, as they have fewer parameters and the nonlinearity is expressed as a linear combination of finite and known functions.

Development of nonlinear models is the critical step in the application of nonlinear model-based control strategies. Nonlinear behavior is prominent in the dynamic behavior of physical systems. Most physical devices have nonlinear characteristics outside a limited linear range. In most chemical processes, for example, understanding the nonlinear characteristics is important for designing controllers that regulate the process. It is rather difficult, yet necessary, to select a reasonable structure for the nonlinear model to capture the process nonlinearities. The nonlinear model used for control purposes should be as simple as possible, warranting minimal computational load and, at the same time, retaining most of the nonlinear dynamic characteristics of the system.

Many model structures have been proposed for the identification of nonlinear systems. The nonlinear static block followed by a dynamic block in the Hammerstein structure has been found to be a simple and effective representation for capturing the dynamics typical of such chemical engineering processes as distillation columns and heat exchangers, for example. Nonlinear system identification involves the following tasks: structure selection, including selection of suitable nonlinear model structures and the number of model parameters; input sequence design, including the determination of the input sequence u(k), which is injected into the system to generate the output sequence y(k); noise modeling, which includes the determination of the dynamic model that generates the noise input w(k); parameter estimation, which includes estimation of the remaining model parameters from the dynamic system data u(k) and y(k), and the noise input w(k); and model validation, including the comparison of system data and model predictions for data not used in model development. In FIG. 1, the input u(k) is a parameter of the static nonlinearity 12, which operates on the input to produce the median or temporary data x(k), which is fed as input to the linear dynamic part 14. Any noise input w(k) mixes within a system component 16, resulting in the output y(k).

Many different techniques have been proposed for the black-box estimation of Hammerstein systems from input-output measurements. These techniques mainly differ in the way that static nonlinearity is represented and in the type of optimization problem that is finally obtained. In parametric approaches, the static nonlinearity is expressed in a finite number of parameters. Both iterative and non-iterative methods have been used for determination of the parameters of the static-nonlinear and linear-dynamic parts of the model. Typical techniques, however, are extremely costly in terms of computational time and energy.

For the parametric methods noted above, the Hammerstein model is represented as:

$$y(k) = \frac{B(q^{-1})}{A(q^{-1})} x(k) + w(k) \tag{1}$$

where $$B(q^{-1}) = b_0 + b_1 q^{-1} + \ldots + b_m q^{-m}; \tag{2 and}$$

$$A(q^{-1}) = 1 + a_1 q^{-1} + \ldots + a_n q^{-n}. \tag{3}$$

The non-measured, intermediate variable x(k) is the output of the static nonlinearity, and is given by:

$$x(k) = c_1 u(k) + c_2 u^2(k) + \ldots + c_L u^L(k), \tag{4}$$

where $q^{-1}$ is the unit delay operator, u(k) is the input, y(k) is the output, w(k) is the measurement noise, (m,n) represent the order of the linear part, and L is the degree of the polynomial. Thus, the problem of Hammerstein model identification is, essentially, the estimation of the unknown parameters $a_1, \ldots, a_n$, $b_0, \ldots, b_m$ and $c_1, \ldots, c_L$ from input-output data.

The unknown parameters are estimated by transforming the problem into a multi-input single-output (MISO) linear identification problem. The inputs to the MISO linear system are u(t), $u^2(t), \ldots, u^L(t)$. The primary drawbacks of this approach are the assumption that the nonlinearity is of polynomial form and the increase in the number of inputs in the linear identification problem. Further, it has been shown that if the nonlinearity is not a polynomial and if the input is not Gaussian, these algorithms do not converge.

As noted above, a variety of nonparametric approaches have been used for Hammerstein model identification. Most of the nonparametric methods use kernel regression estimates to identify the nonlinearity. In these methods, the identification of the nonlinearity is performed separately from the linear part. Recently, neural networks have been used to model the nonlinearity in the Hammerstein model for both single-input single-output (SISO) systems and also multi-input multi-output (MIMO) systems.

None of these methods, however, have considered the case where the structure of the nonlinearity is known with unknown parameters. This case arises in many practical applications, including nonlinear actuators in control systems. Examples of nonlinearities in the actuators include saturation, dead zones, backlash, Coulomb friction, etc. Typically, the mathematical model structure of these nonlinearities is known, but some or all model parameters are not known. Moreover, previous methodologies cannot be used to identify Hammerstein models with non-minimum phase linear parts. Although this problem has been addressed using genetic algorithms, there is a large amount of room for improvement in terms of speed of convergence and accuracy.

In order to improve both speed of convergence and accuracy, it would be desirable to apply an efficient optimization method to such genetic algorithm approaches, such as particle swarm optimization (PSO). Particle swarm optimization (PSO) has been used extensively in solving a wide variety of optimization searching problems. Compared to conventional optimization methods, PSO does not assume that the search space is differentiable or continuous. Further, PSO does not require linearity in the parameters, which is needed in iterative searching optimization techniques. This property of PSO makes it suitable to the identification of Hammerstein models with nonlinearities of known structure and unknown parameters (which represents a nonlinearity in the parameters identification problem).

In the PSO method, the input-output measurement data are used to estimate the model parameters such that a certain objective function is minimized. The advantages of using PSO include the possibility of identifying Hammerstein models with non-minimum phase linear parts and any nonlinearity with known structure and unknown parameters. Particle swarm optimization (PSO) was developed through simulation of a simplified social system. In the simulation model of a social system, each particle position can be thought of as a "state of mind" of a particular setting of abstract variables that represent the individual's beliefs and attitudes. The movement of the particles thus corresponds to the change of these concepts. Swarms or social groups adjust their beliefs and attitudes through the evaluation of stimuli from the environment and compare it to their existing knowledge. If such stimuli or values are found to be more fit, they replace their existing values. These three important properties of human or animal social behavior (i.e., evaluation, comparison, and imitation) are the inspiration for the particle swarm optimization algorithm, and the particle swarm uses these concepts in adapting to environmental changes and solving complex minimization problems.

In addition to being a model of human or animal behavior, the particle swarm is closely related to swarm intelligence. Using PSO, there is no central control and no one gives orders. Each particle is a simple agent acting upon local information. However, the swarm, as a whole, is able to perform tasks whose degree of complexity is well beyond the capabilities of an individual particle. This is due to self-organization. The interactions among the particles (i.e., low level components) result in complex structures at the swarm (i.e., high-level or global) level making is possible to perform optimization of complex functions. The basic principles of PSO are:

a) The proximity principle: The swarm should be able to carry out simple time and space calculations;
b) The quality principle: The swarm should be able to respond to quality factors in the environment;
c) The principle of diverse response: The swarm should not commit its activities along excessively narrow channels;
d) The principle of stability: The swarm should not change its behavior every time the environment changes; and
e) The principle of adaptability: The swarm must be able to change its behavioral mode when it is worth the computational price.

Thus, the PSO system is thought of as an intelligent system. This is because it is based upon artificial life and has roots in Evolutionary Computation (EC). As in other Evolutionary Computation methods, the particle swarm consists of a population of individuals that represent solutions to the optimization problems needed to be solved. An optimal solution is selected through an iterative and probabilistic modification of these solutions. Although large similarities exist between PSO and other Evolutionary Algorithms (EAs) (in EC terms), the true difference lies in how the population/swarm is changed from one iteration to the next. In typical EAs, genetic operators, such as selection, mutation and crossover, are used. In PSO, the particles are modified according to two formulae after each iteration. Further, conceptually, in PSO, the particles remain alive and inhabit the search space during the entire run, whereas in typical EA, the individuals are replaced in each generation. Another fundamental conceptual difference is that in EA, the objective is reached through competitive search, whereas in PSO, it is reached through cooperative search.

The various EA techniques have been successfully applied in many areas. However, PSO is a more robust and more efficient (in terms of time and computation power) algorithm that can solve nonlinear, non-differentiable, multi-modal problems. Such problems involve the minimization of a static objective function; i.e., the main goal of a global minimizer that does not change. The PSO technique can generate a high-quality solution within a shorter calculation time (and with stable convergence) when compared with other stochastic methods.

Due to this ability, PSO is effective in solving problems in a wide variety of scientific fields. As with other EAs, a population of individuals exist in PSO. However, instead of using genetic operators, these individuals are "evolved" through cooperation and competition among themselves, through successive generations. Each particle adjusts its "flight" according to its own experience, as well as its companions' experiences. Each individual, termed a "particle", represents a potential solution to the problem.

In PSO, each particle is treated as a point in D-dimensional space. The i-th particle is represented as:

$$X_i = (x_{i1}, x_{i2}, \ldots, x_{iD}), \quad (5)$$

with the best previous position (i.e., the position giving the best fitness value) of any particle being recorded and represented as:

$$P_i = (p_{i1}, p_{i2}, \ldots, p_{iD}) \quad (6)$$

and with the position change (i.e., velocity) of each particle being given by:

$$V_i = (v_{i1}, v_{i2}, \ldots, v_{iD}). \quad (7)$$

The particles are manipulated according to the following:

$$V_i^{n+1} = w^* V_i^n + c_1^* r_{i1}^{n*} (P_i^n - X_i^n) + C_2^* r_{i2}^{n*} (P_g^n - X_i^n) \quad (8a)$$

$$X_i^{n+1} = X_i^n + x^* V_i^{n+1}. \quad (8b)$$

Thus, a method of identifying Hammerstein models with known nonlinearity structures using particle swarm optimization solving the aforementioned problems is desired.

SUMMARY OF THE INVENTION

The method of identifying Hammerstein models with known nonlinearity structures using particle swarm optimization relates to a computerized method utilizing a particle swarm optimization (PSO)-based scheme for the identification of nonlinear Hammerstein models with known nonlinearity structures. Particularly, this is accomplished by formulating the identification of the Hammerstein model as an optimization problem, with PSO being used in the optimization process.

The PSO-based identification method is summarized by the following steps.

The first step involves generating M input-output data points from a Hammerstein system to be identified, the Hammerstein system having both linear and nonlinear parts, where M is a pre-defined integer and the Hammerstein system is defined by $$y(k) = \frac{B(q^{-1})}{A(q^{-1})} x(k) + w(k),$$

where k is an integer, the Hammerstein system having an input u(k), y(k) represents the output of the Hammerstein system, w(k) represents measurement noise of the Hammerstein system, and q represents a set of parameters describing the nonlinear part, with $q^{-1}$ being the unit delay operator, and $B(q^{-1})$ being defined as $B(q^{-1}) = b_0 + b_1 q^{-1} + \ldots + b_m q^{-m}$ and $A(q^{-1})$ being defined as $A(q^{-1}) = 1 + a_1 q^{-1} + \ldots + a_n q^{-n}$, where m and n are integers and (m, n) represents the order of the linear part, and x(k) represents a non-measured intermediate variable which is the output of the nonlinear part, x(k) being given by $x(k) = f(\theta, u(k))$, where $f(\theta, u(k))$ is a function representing the nonlinear part and $a_1, \ldots, a_n, b_0, \ldots, b_m$ and $\theta$ are unknown parameters to be determined.

The second step involves identifying the Hammerstein system by estimating the unknown parameters $a_1, \ldots, a_n, b_0, \ldots, b_m$ and $\theta$ from the input-output data, the estimation including the third through eighth steps, as follows. The third step is generating a set of random initial solutions for zeros and poles of the linear part and also for the sets of unknown parameters $a_1, \ldots, a_n, b_0, \ldots, b_m$ and $\theta$ of the nonlinear part within a pre-selected range. The fourth step is evaluating a fitness function F for the set of random initial solutions, where the fitness function F is given by $$F = \sum_{k=1}^{M} (y(k) - \hat{y}(k))^2,$$

where:

$$\hat{y}(k) = \frac{\hat{B}(q^{-1})}{\hat{A}(q^{-1})} \hat{x}(k),$$

$$\hat{B}(q^{-1}) = \hat{b}_0 + \hat{b}_1 q^{-1} + \ldots + \hat{b}_m q^{-m},$$

$$\hat{A}(q^{-1}) = 1 + \hat{a}_1 q^{-1} + \ldots + \hat{a}_n q^{-n}, \text{ and}$$

$$\hat{x}(k) = \hat{c}_1 u(k) + \hat{c}_2 u^2(k) + \ldots + \hat{c}_L u^L(k),$$

L being an integer defined by representing the non-measured intermediate variable x(k) as $x(k) = c_1 u(k) + c_2 u^2(k) + \ldots + c_L u^L(k)$, where $c_1, c_2, \ldots c_L$ represent a further set of unknown parameters, and $\hat{a}_1, \ldots, \hat{a}_n, \hat{b}_0, \ldots, \hat{b}_m$ represent estimates of the unknown parameters $a_1, \ldots, a_n, b_0, \ldots, b_m$.

The fifth step is minimizing the fitness function F to generate the estimated unknown parameters $\hat{a}_1, \ldots, \hat{a}_n, \hat{b}_0, \ldots, \hat{b}_m$ and $\theta$. The sixth step is applying particle swarm optimization to the set of solutions by determining the most fit zeros and poles of the linear part calculated in the fourth step. The seventh step is generating a new set of solutions composed of the most fit zeros and poles of the linear part and with the estimated parameters $\hat{a}_1, \ldots, \hat{a}_n, \hat{b}_0, \ldots, \hat{b}_m$ and $\theta$ generated in the sixth step. Finally, the eighth step is repeating the fourth through seventh steps for a pre-determined number of generations.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
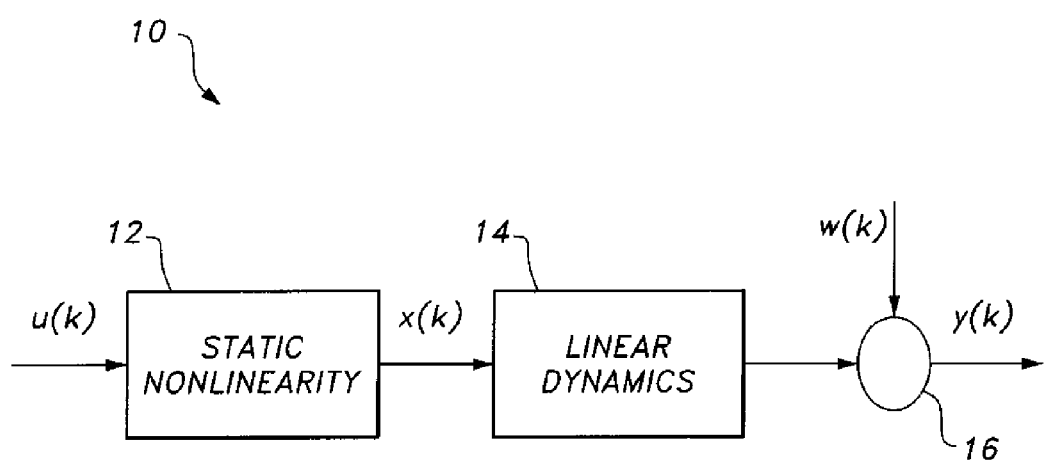
FIG. 1 is a diagrammatic overview of the Hammerstein model structure.

The method of identifying Hammerstein models with known nonlinearity structures using particle swarm optimization is a computerized method utilizing a particle swarm optimization (PSO)-based scheme for the identification of nonlinear Hammerstein models with known nonlinearity structures. Particularly, this is accomplished by formulating the identification of the Hammerstein model as an optimization problem, with PSO being used in the optimization process.

The Hammerstein model is represented by equations (1), (2) and (3). The non-measured intermediate variable x(k) is the output of the nonlinearity, which is given by:

$$x(k) = f(\theta, u(k)), \quad (9)$$

where $q^{-1}$ is the unit delay operator, u(k) is the input, y(k) is the output, w(k) is the measurement noise, (m, n) represent the order of the linear part, f(.) is any nonlinear function, and q is a set of parameters describing the nonlinearity. Thus, the problem of Hammerstein model identification reduces to estimation of the unknown parameters $a_1, \ldots, a_n, b_0, \ldots, b_m$ and $\theta$ from input-output data. For nonlinearities with unknown structure, the polynomial approximation of equation (4) can be used. The use of PSO in the estimation of the unknown parameters requires a fitness function to be defined in order to determine how well the estimates fit the system, and for the domain of the unknown parameters to be specified. The following fitness function may be used:

$$F = \sum_{k=1}^{M} (y(k) - \hat{y}(k))^2 \quad (10)$$

where $$\hat{y}(k) = \frac{\hat{B}(q^{-1})}{\hat{A}(q^{-1})} \hat{x}(k) \quad (11)$$

with $$\hat{B}(q^{-1}) = \hat{b}_0 + \hat{b}_1 q^{-1} + \ldots + \hat{b}_m q^{-m}; \quad (12)$$

$$\hat{A}(q^{-1}) = 1 + \hat{a}_1 q^{-1} + \ldots + \hat{a}_n q^{-n}; \text{ and} \quad (13)$$

$$\hat{x}(k) = \hat{c}_1 u(k) + \hat{c}_2 u^2(k) + \ldots + \hat{c}_L u^L(k), \quad (14)$$

where M is the number of input-output data points used in the identification, and the parameters estimates $\hat{a}_1, \ldots, \hat{a}_n, \hat{b}_0, \ldots, \hat{b}_m$ and $\theta$ are found by minimizing the fitness function given by equation (10).

To determine the domain of the parameters of the linear part, equation (6) and equation (7) can be transformed into pole-zero form, given by:

$$B(q^{-1}) = b_0(1-z_1 q^{-1})(1-z_2 q^{-1})\ldots(1-z_m q^{-1}); \quad (15)$$

and $$A(q^{-1}) = (1-p_1 q^{-1})(1-p_2 q^{-1})\ldots(1-p_n q^{-1}), \quad (16)$$

where $p_i (i=1, \ldots, n)$ and $z_j (j=1, \ldots, m)$ are, in general, complex numbers.

For stable systems, the real and imaginary parts of $p_i$ must lie in the interval from $-1$ to $1$. Further, for minimum phase systems, the real and imaginary parts of $z_i$ must lie in the interval from $-1$ to $1$. If the system is non-minimum phase, then the size of the search space is determined based upon prior knowledge of the system. The size of the search space must also be determined for the parameters describing the nonlinearity. It should be noted that the optimization is non-linear in the parameters and gradient-based optimization techniques can, at best, only produce local minima.

The PSO-based identification method is summarized by the following steps.

The first step involves generating M input-output data points from a Hammerstein system to be identified, the Hammerstein system having both linear and nonlinear parts, where M is a pre-defined integer and the Hammerstein system is defined by $$y(k) = \frac{B(q^{-1})}{A(q^{-1})} x(k) + w(k),$$

where k is an integer, the Hammerstein system having an input $u(k)$, $y(k)$ represents the output of the Hammerstein system, $w(k)$ represents measurement noise of the Hammerstein system, and q represents a set of parameters describing the nonlinear part, with $q^{-1}$ being the unit delay operator, and $B(q^{-1})$ being defined as $B(q^{-1}) = b_0 + b_1 q^{-1} + \ldots + b_m q^{-m}$ and $A(q^{-1})$ being defined as $A(q^{-1}) = 1 + a_1 q^{-1} + \ldots + a_n q^{-n}$, where m and n are integers and (m, n) represents the order of the linear part, and $x(k)$ represents a non-measured intermediate variable which is the output of the nonlinear part, $x(k)$ being given by $x(k) = f(\theta, u(k))$, where $f(\theta, u(k))$ is a function representing the nonlinear part and $a_1, \ldots, a_n, b_0, \ldots, b_n$, and $\theta$ are unknown parameters to be determined.

The second step involves identifying the Hammerstein system by estimating the unknown parameters $a_1, \ldots, a_n, b_0, \ldots, b_m$ and $\theta$ from the input-output data, the estimation including the third through eighth steps, as follows. The third step is generating a set of random initial solutions for zeros and poles of the linear part and also for the sets of unknown parameters $a_1, \ldots, a_n, b_0, \ldots, b_m$ and $\theta$ of the nonlinear part within a pre-selected range. The fourth step is evaluating a fitness function F for the set of random initial solutions, where the fitness function F is given by $$F = \sum_{k=1}^{M} (y(k) - \hat{y}(k))^2,$$

where:

$$\hat{y}(k) = \frac{\hat{B}(q^{-1})}{\hat{A}(q^{-1})} \hat{x}(k),$$

$$\hat{B}(q^{-1}) = \hat{b}_0 + \hat{b}_1 q^{-1} + \ldots + \hat{b}_m q^{-m},$$

$$\hat{A}(q^{-1}) = 1 + \hat{a}_1 q^{-1} + \ldots + \hat{a}_n q^{-n}, \text{ and}$$

$$\hat{x}(k) = \hat{c}_1 u(k) + \hat{c}_2 u^2(k) + \ldots + \hat{c}_L u^L(k),$$

L being an integer defined by representing the non-measured intermediate variable $x(k)$ as $x(k) = c_1 u(k) + c_2 u^2(k) + \ldots + c_L u^L(k)$, where $c_1, c_2, \ldots c_L$ represent a further set of unknown parameters, and $\hat{a}_1, \ldots, \hat{a}_n, \hat{b}_0, \ldots, \hat{b}_m$ represent estimates of the unknown parameters $a_1, \ldots, a_n, b_0, \ldots, b_m$.

The fifth step is minimizing the fitness function F to generate the estimated unknown parameters $\hat{a}_1, \ldots, \hat{a}_n, \hat{b}_0, \ldots, \hat{b}_m$ and $\theta$. The sixth step is applying particle swarm optimization to the set of solutions by determining the most fit zeros and poles of the linear part calculated in the fourth step. The seventh step is generating a new set of solutions composed of the most fit zeros and poles of the linear part and with the estimated parameters $\hat{a}_1, \ldots, \hat{a}_n, \hat{b}_0, \ldots, \hat{b}_m$ and $\theta$ generated in the sixth step. Finally, the eighth step is repeating the fourth through seventh steps for a pre-determined number of generations.

In the above, the particle swarm optimization includes the steps of establishing a set of particles and identifying each particle in the set as a point in D-dimensional space, where the i-th particle is represented as $X_i = (x_{i1}, x_{i2}, \ldots, x_{iD})$ and the most optimal positions of the particles are given by $P_i = (p_{i1}, p_{i2}, \ldots, p_{iD})$, with a change in velocity of each of the particles being given by $V_i = (v_{i1}, v_{i2}, \ldots, v_{iD})$, such that the velocity and position of each particle is updated as $V_i^{n+1} = w*V_i^n + c_1*r_{i1}^{n}*(P_i^n - X_i^n) + c_2*r_{i2}^{n}*(P_g^n - X_i^n)$ and $X_i^{n+1} = X_i^n + x**V_i^{n+1}$, where w is an inertial weight parameter for limiting velocity, and $c_1$ and $c_2$ represent a cognitive parameter and a social parameter, respectively.

The value of $c_1$ signifies how much a particle trusts its past experiences, and how much it searches for solutions around the local best position, while the value of $c_2$ determines the swarm's attraction toward a global best position. Higher values of $c_1$ and $c_2$ make the swarm able to react faster to changes, whereas lower values of these parameters make the swarm slower in changing neighborhoods of solutions.

The domain of parameters of the linear part is generated by transforming $P_i = (p_{i1}, p_{i2}, \ldots, p_{iD})$ and $V_i = (v_{i1}, v_{i2}, \ldots, v_{iD})$ to pole-zero form as:

$$B(q^{-1}) = b_0(1-z_1 q^{-1})(1-z_2 q^{-1})\ldots(1-z_m q^{-1}) \text{ and}$$

$$A(q^{-1}) = (1-p_1 q^{-1})(1-p_2 q^{-1})\ldots(1-p_n q^{-1}),$$

where $p_i (i=1, \ldots, n)$ and $z_j (j=1, \ldots, m)$ are complex numbers, each having real and imaginary parts found within the interval between $-1$ and $1$.

Simulations using the above method have shown that the accuracy of estimation of the parameters is greatly affected by the choice of the input signals. This is due to the fact that any model developed from an input-output data set is merely a representation of the information contained in that data set. Among the most important issues that must be considered when generating input signals for system identification are the following.

The first issue is system noise. If the system is noisy, it may be necessary to increase the amplitude of the input signals so that the signal-to-noise ratio is large enough and estimates of acceptable accuracy can be obtained;

The second issue is nonlinearities. The input signals must be suitable for obtaining a characterization of the nonlinearities' behavior. The amplitude of the input signals must be increased to enable the nonlinearities of the system. The selected maximum input amplitude influences the model parameter estimates. For example, a small input amplitude that does not enable the nonlinearity will result in a linear model for the nonlinear system.

Finally, the third issue is identifiability. Certain conditions must be imposed on the input signals so that the underlying properties of the linear part can be identified. This means that the input signals should be persistently exciting, which requires that the signal should adequately span the bandwidth of the system being identified. Uniform or Gaussian random inputs may used in the identification of nonlinear systems.

In the below, the present identification method is applied to different examples with practical static nonlinearities, including a saturation nonlinearity, a Coulomb friction nonlinearity, and saturation with a dead zone with different linear parts. The performance is evaluated under various signal to noise ratios (SNRs). As an example, a process is considered with the linear part of the process being given by:

$$\frac{y(k)}{x(k)} = \frac{(1-z_1 q^{-1})(1-z_2 q^{-1})}{(1-p_1 q^{-1})(1-p_2 q^{-1})(1-p_3 q^{-1})}. \tag{17}$$

A variety of different pole-zero configurations and different nonlinearities have been applied, as shown below in Table 1:

TABLE 1

| | Zeros and poles of linear part | Type of non-linearity | Parameters of the nonlinearity |
|---|---|---|---|
| True values | $z_1 = 4.1, p_1 = 0.8,$ $p_2 = -0.2,$ $p_3 = -0.5$ | Saturation $x(k) = \alpha$ for $u(k) \geq \frac{\alpha}{2}$; $x(k) = \beta u(k)$ for $-\frac{\alpha}{2} \leq u(k) \leq \frac{\alpha}{2}$; $x(k) = -\alpha$ for $u(k) \leq -\frac{\alpha}{2}$ | $\alpha = 0.5$ $\beta = 2.2$ |
| Estimated values: SNR = 30 dB | $z_1 = 4.0973,$ $p_1 = 0.7999,$ $p_2 = -0.19995,$ $p_3 = -0.5002$ | Saturation $x(k) = \alpha$ for $u(k) \geq \frac{\alpha}{2}$; $x(k) = \beta u(k)$ for $-\frac{\alpha}{2} \leq u(k) \leq \frac{\alpha}{2}$; $x(k) = -\alpha$ for $u(k) \leq -\frac{\alpha}{2}$ | $\alpha = 0.5000$ $\beta = 2.2013$ |
| Estimated values: SNR = 10 dB | $z_1 = 4.0895,$ $p_1 = 0.7995,$ $p_2 = -0.1987,$ $p_3 = -0.5004$ | Saturation $x(k) = \alpha$ for $u(k) \geq \frac{\alpha}{2}$; $x(k) = \beta u(k)$ for $-\frac{\alpha}{2} \leq u(k) \leq \frac{\alpha}{2}$; $x(k) = -\alpha$ for $u(k) \leq -\frac{\alpha}{2}$ | $\alpha = 0.5000$ $\beta = 2.2048$ |
| True values | $z_1 = 1.2,$ $p_1 = 0.1 - j0.5,$ $p_2 = 0.1 + j0.5,$ $p_3 = 0.9$ | Coulombic friction $x(k) = \sin(u(k))\{\alpha \mid u(k)\mid + \beta\}$ | $\alpha = 4.0$ $\beta = 0.5$ |
| Estimated values: SNR = 30 dB | $z_1 = 1.1999,$ $p_1 = 0.1 - j0.4999,$ $p_2 = 0.1 + j0.4999,$ $p_3 = 0.9$ | Coulombic friction $x(k) = \sin(u(k))\{\alpha \mid u(k)\mid + \beta\}$ | $\alpha = 4.0$ $\beta = 0.5001$ |

TABLE 1-continued

| | Zeros and poles of linear part | Type of non-linearity | Parameters of the nonlinearity |
|---|---|---|---|
| Estimated values: SNR = 10 dB | $z_1 = 1.1996,$ $p_1 = 0.0999 - j0.4994,$ $p_2 = 0.0999 + j0.4994,$ $p_3 = 0.8998$ | Coulombic friction $x(k) = \sin(u(k))\{\alpha \mid u(k)\mid + \beta\}$ | $\alpha = 4.0$ $\beta = 0.5005$ |
| True values | $z_1 = 0.2, p_1 = 2.8,$ $p_2 = -0.2,$ $p_3 = -0.5$ | Relay with dead zone $x(k) = \alpha$ for $u(k) \geq \beta$; $x(k) = 0$ for $-\beta \leq u(k) \leq \beta$; $x(k) = -\alpha$ for $u(k) \leq -\beta$ | $\alpha = 4.1$ $\beta = 0.5$ |
| Estimated values: SNR = 30 dB | $z_1 = 0.2074,$ $p_1 = 2.8032,$ $p_2 = -0.1899,$ $p_3 = -0.5032$ | Relay with dead zone $x(k) = \alpha$ for $u(k) \geq \beta$; $x(k) = 0$ for $-\beta \leq u(k) \leq \beta$; $x(k) = -\alpha$ for $u(k) \leq -\beta$ | $\alpha = 4.0985$ $\beta = 0.5002$ |
| Estimated values: SNR = 10 dB | $z_1 = 0.1889,$ $p_1 = 2.8069,$ $p_2 = -0.2173,$ $p_3 = -0.4929$ | Relay with dead zone $x(k) = \alpha$ for $u(k) \geq \beta$; $x(k) = 0$ for $-\beta \leq u(k) \leq \beta$; $x(k) = -\alpha$ for $u(k) \leq -\beta$ | $\alpha = 4.0869$ $\beta = 0.4995$ |

Figure 2:
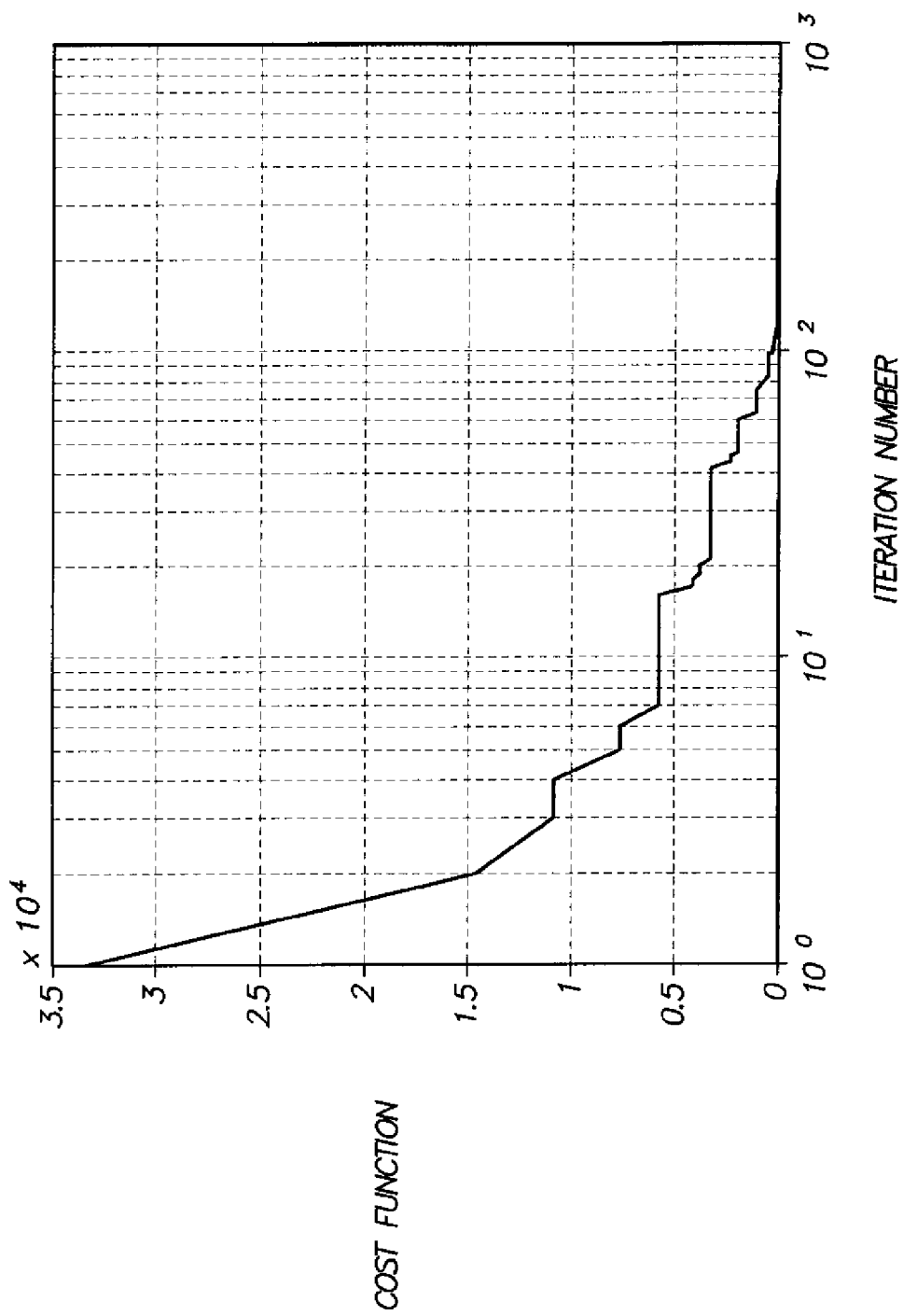
FIG. 2 is a graph illustrating convergence of a cost function associated with the method of identifying Hammerstein models with known nonlinearity structures using particle swarm optimization according to the present invention.

Using uniformly distributed random inputs in the range [−1,1], the process outputs are generated using the present method. The added measurement noise is zero mean white Gaussian with different variances to achieve different SNRs. The present identification method is used to identify the poles, zeros and parameters of the different nonlinearities, as shown above in Table 1. The results shown in Table 1 indicate that accurate and consistent results can be obtained even for low SNR values. The behavior of the cost function for one of the examples given in Table 1 is shown in FIG. 2, which indicates a rapid convergence to the optimal solution.

Figure 3:
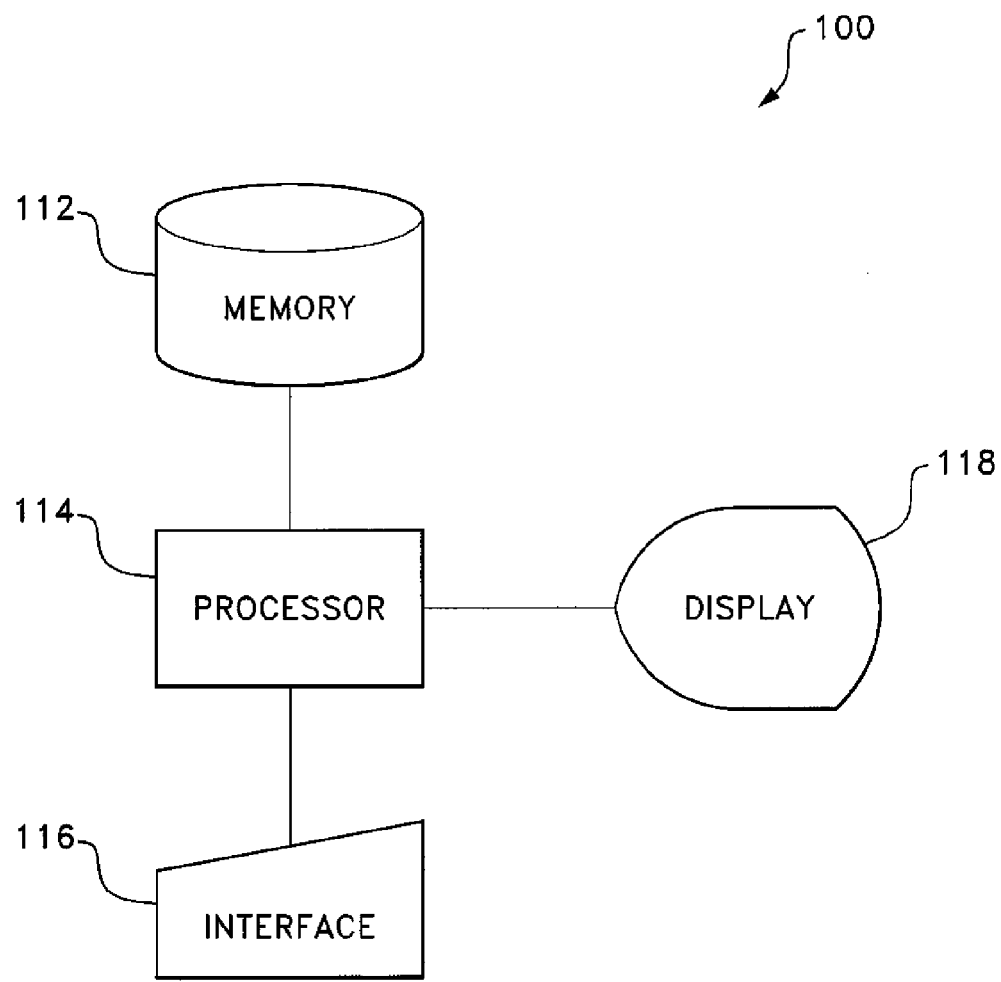
FIG. 3 is a block diagram illustrating a system for implementing the method of identifying Hammerstein models with known nonlinearity structures using particle swarm optimization according to the present invention.

In the above, the calculations may be performed by any suitable computer system, such as that diagrammatically shown in FIG. 3. Data is entered into system 100 via any suitable type of user interface 116, and may be stored in memory 112, which may be any suitable type of computer readable and programmable memory. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

It is to be understood that the present invention is not limited to the embodiments described above, but encompasses any and all embodiments within the scope of the following claims.

I claim:

1. A computerized method of identifying Hammerstein models with known nonlinearity structures using particle swarm optimization, comprising the steps of:

(a) generating M input-output data points from a Hammerstein system to be identified, the Hammerstein system having both linear and nonlinear parts, wherein M is a pre-defined integer and the Hammerstein system is defined by $$y(k) = \frac{B(q^{-1})}{A(q^{-1})}x(k) + w(k),$$

where k is an integer, the Hammerstein system having an input u(k), y(k) representing the output of the Hammerstein system, w(k) representing measurement noise of the Hammerstein system, and q representing a set of parameters describing the nonlinear part, with $q^{-1}$ being the unit delay operator, and $B(q^{-1})$ being defined as $B(q^{-1})=b_0+b_1q^{-1}+\ldots+b_mq^{-m}$ and $A(q^{-1})$ being defined as $A(q^{-1})=1+a_1q^{-1}+\ldots+a_nq^{-n}$, where m and n are integers and (m, n) represents the order of the linear part, and x(k) represents a non-measured intermediate variable which is the output of the nonlinear part, x(k) being given by $x(k)=f(\theta,u(k))$, where $f(\theta,u(k))$ is a function representing the nonlinear part and $a_1,\ldots,a_n, b_0,\ldots,b_m$ and $\theta$ are unknown parameters to be determined, wherein the generation of the M input-output data points is performed by a computer processor;

(b) identifying the Hammerstein system by estimating the unknown parameters $a_1,\ldots,a_n, b_0,\ldots,b_m$ and $\theta$ from the input-output data, the estimation comprising the following steps (c) through (h) and being performed by the computer processor:

(c) generating a set of random initial solutions for zeros and poles of the linear part and also for the sets of unknown parameters $a_1,\ldots,a_n, b_0,\ldots,b_m$ and $\theta$ of the nonlinear part within a pre-selected range;

(d) evaluating a fitness function F for the set of random initial solutions, wherein the fitness function F is given by $$F = \sum_{k=1}^{M}(y(k)-\hat{y}(k))^2, \text{ where } \hat{y}(k) = \frac{\hat{B}(q^{-1})}{\hat{A}(q^{-1})}\hat{x}(k),$$

$$\hat{B}(q^{-1}) = \hat{b}_0 + \hat{b}_1 q^{-1} + \ldots + \hat{b}_m q^{-m},$$

$$\hat{A}(q^{-1}) = 1 + \hat{a}_1 q^{-1} + \ldots + \hat{a}_n q^{-n}, \text{ and}$$

$$\hat{x}(k) = \hat{c}_1 u(k) + \hat{c}_2 u^2(k) + \ldots + \hat{c}_L u^L(k),$$

L being an integer defined by representing the non-measured intermediate variable x(k) as $x(k)=c_1 u(k)+c_2 u^2(k)+\ldots+c_L u^L(k)$, where $c_1, c_2,\ldots,c_L$ represent a further set of unknown parameters, and $\hat{a}_1,\ldots,\hat{a}_n, \hat{b}_0,\ldots,\hat{b}_m$ represent estimates of the unknown parameters $a_1,\ldots,a_n, b_0,\ldots,b_m$;

(e) minimizing the fitness function F to generate the estimated unknown parameters $\hat{a}_1,\ldots,\hat{a}_n, \hat{b}_0,\ldots,\hat{b}_m$ and $\theta$, (f) applying particle swarm optimization to the set of solutions by determining the most fit zeros and poles of the linear part calculated in step (d);

(g) generating a new set of solutions composed of the most fit zeros and poles of the linear part and with the estimated parameters $\hat{a}_1,\ldots,\hat{a}_n, \hat{b}_0,\ldots,\hat{b}_m$ and $\theta$ generated in step (e); and (h) repeating steps (d) through (g) for a predetermined number of generations.

2. The computerized method of identifying Hammerstein models as recited in claim 1, wherein the particle swarm optimization includes establishing a set of particles and identifying each particle in the set as a point in D-dimensional space, wherein the i-th particle is represented as $X_i=(x_{i1}, x_{i2},\ldots,x_{iD})$ and the most optimal positions of the particles are given by $P_i=(p_{i1}, p_{i2},\ldots,p_{iD})$, with a change in velocity of each of the particles being given by $V_i=(v_{i1}, v_{i2},\ldots,v_{iD})$, such that the velocity and position of each particle is updated as $V_i^{n+1}=w*V_i^n+c_1*r_{i1}^n*(P_i^n-X_i^n)+c_2*r_{i2}^n*(P_g^n-X_i^n)$ and $X_i^{n+1}=X_i^n+x*V_i^{n+1}$, wherein w is an inertial weight parameter for limiting velocity, and $c_1$ and $c_2$ represent a cognitive parameter and a social parameter, respectively, wherein the establishment of the set of particles and the identification of each particle in the set are performed by the computer processor.

3. The computerized method of identifying Hammerstein models as recited in claim 2, wherein a domain of parameters of the linear part is generated by transforming $P_i=(p_{i1}, p_{i2},\ldots,p_{iD})$ and $V_i=(v_{i1}, v_{i2},\ldots,v_{iD})$ to pole-zero form as:

$$B(q^{-1})=b_0(1-z_1q^{-1})(1-z_2q^{-1})\ldots(1-z_mq^{-1}) \text{ and}$$

$$A(q^{-1})=(1-p_1q^{-1})(1-p_2q^{-1})\ldots(1-p_nq^{-1}),$$

where $p_i (i=1,\ldots,n)$ and $z_j (j=1,\ldots,m)$ are complex numbers, wherein the generation of the domain of parameters of the linear part is performed by the computer processor.

4. The computerized method of identifying Hammerstein models as recited in claim 3, wherein both the real and imaginary parts of $p_i$ are within the interval between −1 and 1.

5. The computerized method of identifying Hammerstein models as recited in claim 4, wherein both the real and imaginary parts of $z_i$ are within the interval between −1 and 1.

6. A system for identifying Hammerstein models with known nonlinearity structures using particle swarm optimization, comprising:
a processor;
computer readable memory coupled to the processor;
a user interface coupled to the processor;
a display coupled to the processor
software stored in the memory and executable by the processor, the software having:
means for generating M input-output data points from a Hammerstein system to be identified, the Hammerstein system having both linear and nonlinear parts, wherein M is a pre-defined integer and the Hammerstein system is defined by $$y(k) = \frac{B(q^{-1})}{A(q^{-1})}x(k) + w(k),$$

where k is an integer, the Hammerstein system having an input u(k), y(k) representing the output of the Hammerstein system, w(k) representing measurement noise of the Hammerstein system, and q representing a set of parameters describing the nonlinear part, with $q^{-1}$ being the unit delay operator, and $B(q^{-1})$ being defined as $B(q^{-1})=b_0+b_1q^{-1}+\ldots+b_mq^{-m}$ and $A(q^{-1})$ being defined as $A(q^{-1})=1+a_1q^{-1}+\ldots+a_nq^{-n}$, where m and n are integers and (m, n) represents the order of the linear part, and x(k) represents a non-measured intermediate variable which is the output of the nonlinear part, x(k) being given by $x(k)=f(\theta,u(k))$, where $f(\theta,u(k))$ is a function representing the nonlinear part and $a_1,\ldots,a_n, b_0,\ldots,b_m$ and $\theta$ are unknown parameters to be determined;
means for identifying the Hammerstein system by estimating the unknown parameters $a_1,\ldots,a_n, b_0,\ldots,b_m$ and $\theta$ from the input-output data;
means for estimating the unknown parameters $a_1,\ldots,a_n, b_0,\ldots,b_m$ and $\theta$ from the input-output data, the means for estimating including:
means for generating a set of random initial solutions for zeros and poles of the linear part and also for the sets of unknown parameters $a_1, \ldots, a_n, b_0, \ldots, b_m$ and $\theta$ of the nonlinear part within a pre-selected range;

means for evaluating a fitness function F for the set of random initial solutions, wherein the fitness function F is given by:

$$F = \sum_{k=1}^{M}(y(k) - \hat{y}(k))^2, \text{ where } \hat{y}(k) = \frac{\hat{B}(q^{-1})}{\hat{A}(q^{-1})}\hat{x}(k),$$

$$\hat{B}(q^{-1}) = \hat{b}_0 + \hat{b}_1 q^{-1} + \ldots + \hat{b}_m q^{-m},$$

$$\hat{A}(q^{-1}) = 1 + \hat{a}_1 q^{-1} + \ldots + \hat{a}_n q^{-n}, \text{ and}$$

$$\hat{x}(k) = \hat{c}_1 u(k) + \hat{c}_2 u^2(k) + \ldots + \hat{c}_L u^L(k),$$

L being an integer defined by representing the non-measured intermediate variable x(k) as $x(k)=c_1u(k)+c_2u^2(k)+\ldots+c_L u^L(k)$, where $c_1, c_2, \ldots, c_L$ represent a further set of unknown parameters, and $\hat{a}_1, \ldots, \hat{a}_n, \hat{b}_0, \ldots, \hat{b}_m$ represent estimates of the unknown parameters $a_1, \ldots, a_n, b_0, \ldots, b_m$;

means for minimizing the fitness function F to generate the estimated unknown parameters $\hat{a}_1, \ldots, \hat{a}_n, \hat{b}_0, \ldots, \hat{b}_m$ and $\theta$, means for applying particle swarm optimization to the set of solutions by determining the most fit zeros and poles of the linear part;

means for generating a new set of solutions composed of the most fit zeros and poles of the linear part and with the estimated parameters $\hat{a}_1, \ldots, \hat{a}_n, \hat{b}_0, \ldots, \hat{b}_m$ and $\theta$; and means for repeating the estimation for a pre-determined number of generations.

7. A computer software product that includes a non-transitory storage medium readable by a processor, the non-transitory storage medium having stored thereon a set of instructions for identifying Hammerstein models with known nonlinearity structures using particle swarm optimization, the instructions comprising:

(a) a first sequence of instructions which, when executed by the processor, causes the processor to generate M input-output data points from a Hammerstein system to be identified, the Hammerstein system having both linear and nonlinear parts, wherein M is a pre-defined integer and the Hammerstein system is defined by $$y(k) = \frac{B(q^{-1})}{A(q^{-1})}x(k) + w(k),$$

where k is an integer, the Hammerstein system having an input u(k), y(k) representing the output of the Hammerstein system, w(k) representing measurement noise of the Hammerstein system, and q representing a set of parameters describing the nonlinear part, with $q^{-1}$ being the unit delay operator, and $B(q^{-1})$ being defined as $B(q^{-1})=b_0+b_1q^{-1}+\ldots+b_m q^{-m}$ and $A(q^{-1})$ being defined as $A(q^{-1})=1+a_1q^{-1}+\ldots+a_n q^{-n}$, where m and n are integers and (m, n) represents the order of the linear part, and x(k) represents a non-measured intermediate variable which is the output of the nonlinear part, x(k) being given by $x(k)=f(\theta,u(k))$, where $f(\theta,u(k))$ is a function representing the nonlinear part and $a_1, \ldots, a_n, b_0, \ldots, b_m$ and $\theta$ are unknown parameters to be determined;

(b) a second sequence of instructions which, when executed by the processor, causes the processor to identify the Hammerstein system by estimating the unknown parameters $a_1, \ldots, a_n, b_0, \ldots, b_m$ and $\theta$ from the input-output data, the estimation comprising the following sequences of instructions (c) through (h):

(c) a third sequence of instructions which, when executed by the processor, causes the processor to generate a set of random initial solutions for zeros and poles of the linear part and also for the sets of unknown parameters $a_1, \ldots, a_n, b_0, \ldots, b_m$ and $\theta$ of the nonlinear part within a pre-selected range;

(d) a fourth sequence of instructions which, when executed by the processor, causes the processor to evaluate a fitness function F for the set of random initial solutions, wherein the fitness function F is given by:

$$F = \sum_{k=1}^{M}(y(k) - \hat{y}(k))^2, \text{ where } \hat{y}(k) = \frac{\hat{B}(q^{-1})}{\hat{A}(q^{-1})}\hat{x}(k),$$

$$\hat{B}(q^{-1}) = \hat{b}_0 + \hat{b}_1 q^{-1} + \ldots + \hat{b}_m q^{-m},$$

$$\hat{A}(q^{-1}) = 1 + \hat{a}_1 q^{-1} + \ldots + \hat{a}_n q^{-n}, \text{ and}$$

$$\hat{x}(k) = \hat{c}_1 u(k) + \hat{c}_2 u^2(k) + \ldots + \hat{c}_L u^L(k),$$

L being an integer defined by representing the non-measured intermediate variable x(k) as $x(k)=c_1u(k)+c_2u^2(k)+\ldots+c_L u^L(k)$, where $c_1, c_2, \ldots, c_L$ represent a further set of unknown parameters, and $\hat{a}_1, \ldots, \hat{a}_n, \hat{b}_0, \ldots, \hat{b}_m$ represent estimates of the unknown parameters $a_1, \ldots, a_n, b_0, \ldots, b_m$;

(e) a fifth sequence of instructions which, when executed by the processor, causes the processor to minimizing the fitness function F to generate the estimated unknown parameters $\hat{a}_1, \ldots, \hat{a}_n, \hat{b}_0, \ldots, \hat{b}_m$ and $\theta$;

(g) a sixth sequence of instructions which, when executed by the processor, causes the processor to applying particle swarm optimization to the set of solutions by determining the most fit zeros and poles of the linear part calculated in the fourth sequence of instructions;

(h) a seventh sequence of instructions which, when executed by the processor, causes the processor to generate a new set of solutions composed of the most fit zeros and poles of the linear part and with the estimated parameters $\hat{a}_1, \ldots, \hat{a}_n, \hat{b}_0, \ldots, \hat{b}_m$ and $\theta$ generated in the fifth sequence of instructions; and (i) an eighth sequence of instructions which, when executed by the processor, causes the processor to repeat the fourth through seventh sequences of instructions for a pre-determined number of generations.

* * * * *